(12) United States Patent
McKinny et al.

(10) Patent No.: US 9,535,166 B2
(45) Date of Patent: Jan. 3, 2017

(54) METHOD FOR SIMULTANEOUSLY MEASURING THE INDIVIDUAL OUTPUTS OF PARTICLE DETECTORS IN AN ARRAY USING CHARGE DIVISION ELECTRONICS

(71) Applicant: General Electric Company, Schenectady, NY (US)

(72) Inventors: Kevin Scott McKinny, Hudson, OH (US); Matthew Thomas McPheeters, Cleveland Hgts., OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 343 days.

(21) Appl. No.: 14/272,537

(22) Filed: May 8, 2014

(65) Prior Publication Data

US 2015/0323680 A1    Nov. 12, 2015

(51) Int. Cl.
*G01J 1/42* (2006.01)
*G01T 1/17* (2006.01)
*G01T 1/29* (2006.01)
*G01T 1/208* (2006.01)

(52) U.S. Cl.
CPC .................. *G01T 1/17* (2013.01); *G01T 1/208* (2013.01); *G01T 1/2921* (2013.01)

(58) Field of Classification Search
CPC .................................................... G01T 1/208
See application file for complete search history.

(56) References Cited

U.S. PATENT DOCUMENTS

2011/0192980 A1    8/2011    Lee et al.

FOREIGN PATENT DOCUMENTS

GB    1578881 A    11/1980

OTHER PUBLICATIONS

"Optimizing Position Readout Circuits in Positron Emission Tomography Front-End Electronics", IEEE Transactions on Nuclear Science, vol. 50, No. 5, Oct. 2003 to Zhang et al.*
"A simple Technique to Increase the Linearity and Field-of-View in Position Sensitive Photomultiplier Tubes", IEEE Transactions on Nuclear Science, vol. 44, No. 3, Jun. 1997, p. 494-498 to Clancy et al.*

(Continued)

*Primary Examiner* — David J Makiya
*Assistant Examiner* — Kenneth J Malkowski
(74) *Attorney, Agent, or Firm* — Cooper Legal Group, LLC

(57) ABSTRACT

A detector arrangement for detecting at least one of rays, ions and particles includes a plurality of detectors. Each detector has a respective anode output and the detectors are arranged with the respective anode outputs being in an electrical series. The arrangement includes a plurality of resistive elements interspersed in the electrical series. The arrangement includes a first measurement point at a first end of the electrical series and a second measurement point at a second end of the electrical series. The arrangement includes electrical circuitry, electrically connected to the first and second measurement points for receiving electrical signals/pulses from the first and second measurement points, and for using the electrical signals/pulses from the first and second measurement points to determine which of the plurality of detectors has detected the at least one of rays, ions and particles.

19 Claims, 4 Drawing Sheets

(56) References Cited

OTHER PUBLICATIONS

Alberi, "Position Readout by Charge Division in Large Two-Dimensional Detectors", IEEE Transactions on Nuclear Science, vol. No. NS-24, Issue No. 1, pp. 184-194, Feb. 1, 1977.
Boie et al., "High Precision Position Readout for Large Area Neutron Detectors", IEEE Transactions on Nuclear Science, vol. No. 27, Issue No. 1, pp. 338-350, Feb. 1, 1980.
Bofill et al., "The Application of Resistive Charge Division in Large Proportional Tube Chambers", IEEE Transactions on Nuclear Science, vol. No. NS-29, Issue No. 1, pp. 400-401, Feb. 1, 1982.
International Search Report and Written Opinion issued in connection with corresponding PCT Application No. PCT/US2015/029844 dated Aug. 14, 2015.

* cited by examiner

METHOD FOR SIMULTANEOUSLY MEASURING THE INDIVIDUAL OUTPUTS OF PARTICLE DETECTORS IN AN ARRAY USING CHARGE DIVISION ELECTRONICS

BACKGROUND OF THE INVENTION

Field of the Invention

The invention relates to a detector arrangement having a plurality of detectors in an array for detecting rays and/or ions/particles (e.g., neutrons, gamma rays and the like).

Discussion of Prior Art

A detector arrangement, such as a neutron detector arrangement, includes a plurality of separate detectors, such as neutron detectors, in an array. Such a neutron detector arrangement provides for the plurality of detectors to be positioned across an area, e.g., within a panel or well counter. The detectors of the detector arrangement are operatively connected to sensory and/or processing equipment, circuitry or the like. Various properties, characteristics, and other information can be discerned by the detections, e.g., of neutrons, by the detectors.

Within one type of arrangement, the detectors are connected in parallel such that the collective output are serially connected and can be provided to common processing circuitry. Such serial connection of outputs provides for efficiency in processing circuitry via provision of the processing circuitry and being commonly processed by the common processing circuitry. However, the serial connection of detector outputs in the array and/or the common processing circuitry may make it difficult to determine which of the plural detectors actually experiences a specific detection event (i.e., reception of a neutron). Also, the serial connection of detectors and/or the common processing circuitry may make it difficult to determine which, if any, of the detectors is not properly operating to perform a detection event.

As such the present inventors have realized that there is a need for improvements concerning detector arrangements that have serially connected detectors in an array.

BRIEF DESCRIPTION OF THE INVENTION

The following summary presents a simplified summary in order to provide a basic understanding of some aspects of the arrangements and/or methods discussed herein. This summary is not an extensive overview of the arrangements and/or methods discussed herein. It is not intended to identify key/critical elements or to delineate the scope of such arrangements and/or methods. Its sole purpose is to present some concepts in a simplified form as a prelude to the more detailed description that is presented later.

In accordance with one aspect, the present invention provides a detector arrangement for detecting at least one of rays, ions and particles. The arrangement includes a plurality of detectors, each for detecting the at least one of rays, ions and particles. Each detector has a respective anode output for outputting a charge upon detection of the at least one of rays, ions and particles at the respective detector. The plurality of detectors are arranged with the respective anode outputs being in an electrical series. The arrangement includes a plurality of resistive elements, each resistive element having a resistance value, interspersed in the electrical series with the anode outputs of the plurality of detectors. The arrangement includes a first measurement point at a first end of the electrical series and a second measurement point at a second end of the electrical series. The arrangement includes electrical circuitry, electrically connected to the first and second measurement points for receiving electrical signals/pulses from the first and second measurement points, and for using the electrical signals/pulses from the first and second measurement points to determine which of the plurality of detectors has detected the at least one of rays, ions and particles.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
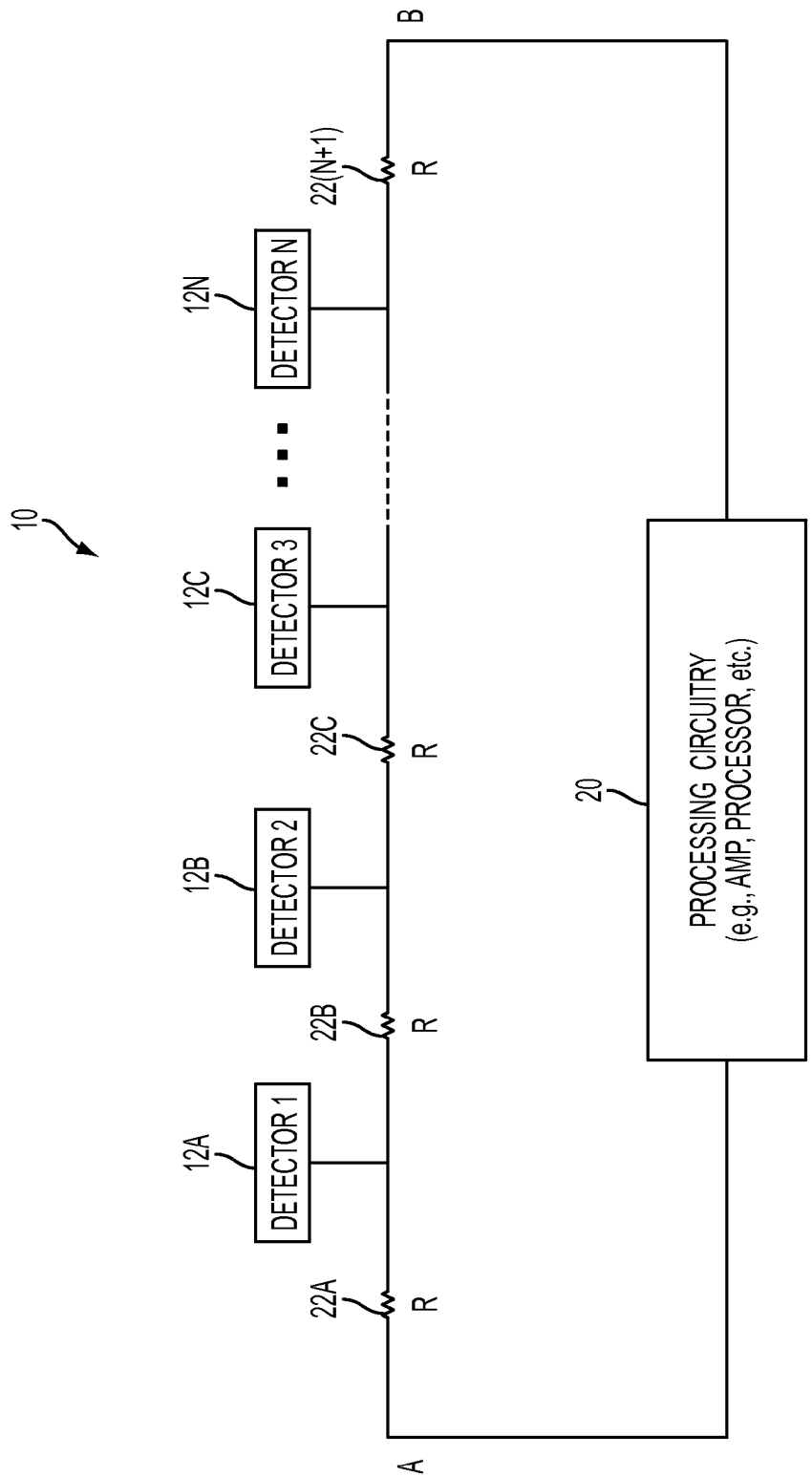
FIG. 1 is a schematic illustration of an example neutron detector arrangement having a plurality of serially connected detector outputs and interconnected charge division resistive elements in accordance with an aspect of the present invention.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

An example of a detector arrangement 10 for detecting rays and/or ions/particles (e.g., neutrons, gamma rays and the like) is schematically shown within FIG. 1. Within one specific example, the detector arrangement 10 is for neutron detection. It is to be appreciated that neutron detection is but one example type of detection that can be performed and that the specific type of detection is not to be a specific limitation upon the present invention. The present invention is equally applicable to other types of detection.

For the sake of providing details concerning an example, the detector arrangement 10 is discussed for the specific example of neutron detection. As such with the discussed example, neutron activity (e.g., neutron(s) moving to the detector arrangement and being detected thereat—impingement) is being detected within the detector arrangement 10.

The detector arrangement 10 includes a plurality of detectors 12A-12N in an array. It is to be appreciated that a generic number "N" of detectors are present and that the generic number can be any number greater than one (i.e., "N" can be any plural number). Also, it is to be appreciated that within discussion of the detectors 12A-12N, the discussion can be generic for all of the detectors and/or applicable to any of the specific detectors.

Each detector (e.g., 12A-12N) includes at least one neutron sensitive material. For example, each detector (e.g., 12A-12N) may utilize ionization of gas containing Helium-3 (He-3 or $^3$He) to detect neutrons. As another example, each detector (e.g., 12A-12N) may include other neutron sensitive material (e.g., Boron-10 or B-10). As still another example, a combination of He-3 and B-10 may be included. Of course, for detecting other rays and/or ions/particles the detectors would include other suitably sensitive material.

It is to be appreciated that within the presented example each detector (e.g., 12A-12N) includes a cathode and anode, not specifically shown, and that neutron activity (e.g., neutron(s) moving to detector(s) and being detected thereat) causes a detectable current at the anode. For example, each neutron detector (e.g., 12A-12N) includes an anode (e.g., a wire) extending axially through a cathode shell, with an insulator separating the anode from the cathode shell. To detect neutrons, ions/particles resulting from neutron reactions within the neutron sensitive material inside the respective detector will collide with gas molecules within the detector to produce electron-ion pairs. These electrons and ions are drawn to the anode and cathode, respectively, whereupon they generate an electrical signal/pulse at an anode output of the detector. A respective output connection is electrically connected to receive the generated signal/pulse and provide the signal/pulse as an output of the respective detector. Of course, variations in detector construction/operation are contemplated and not limited to the presented example.

Turning again to the overall detector arrangement 10, it is to be appreciated that the plurality of detectors 12A-12N is electrically connected with the anode outputs in a serial electrical connection between two measure points (herein designated Measurement Point A and Measurement Point B). The Measurement Points A and B are electrically connected to electrical circuitry 20 (schematically represented) for processing the electrical signals/pulses from the detectors 12A-12N of the detector arrangement 10. As such, in one example, the electrical circuitry 20 can be considered to be processing circuitry. It is to be appreciated that the electrical circuitry 20 may have a variety of specific structures/configurations to process/utilize the electrical signals/pulses from the detectors 12A-12N. For example, the electrical circuitry 20 may include one or more amplifiers (i.e., preamplifiers), one or more counters, one or more processors, one or more memories, one or more clocks and the like. It is to be noted that for the shown example the serially connected array of detector outputs has the two Measurement Points A and B for the provision of input to the electrical circuitry 20.

In accordance with an example aspect of the present invention, the arrangement has at least some plural number (i.e., a plurality) of charge division resistive elements that are interspersed in the electrical series with the anode outputs of the plurality of detectors. In accordance with an specific example aspect of the present invention, the arrangement has a plurality of charge division resistive elements identified as 22B-22N within the serial electrical connection and separating the plurality of detector anode outputs within the serial electrical connection, and also a charge division resistive element (e.g., 22A and 22(N+1)) at each end of the serial electrical connection adjacent to the two Measurement Points A and B. It is to be appreciated that in the context of amount numbers within the present example, there is one more charge division resistive element (e.g., the number N+1) than the number of detectors (e.g., the number N). Again, in view of the number N being any plural number, the number N+1 is one more than that number N. It is also to be appreciated that the Measurement Point A and Measurement Point B, beyond the first and last-most respective charge division resistive elements 22A and 22(N+1), are each operatively connected to the electrical circuitry 20 and thus the electrical signals/pulses from the detectors are provided to the electrical circuitry via the first and last-most respective charge division resistive elements 22A and 22(N+1). However, it is to be appreciated that a different plurality may be provided. For example, one or more resistive elements from the above-discussed resistive elements 22A-22(N+1) may be omitted. As specific examples, the resistive element at one or both ends may be omitted and/or one or more resistive elements between two adjacent detector outputs may be omitted.

It is to be appreciated that each of resistive elements (e.g., 22A-22(N+1)) has an electrical resistance value. However, it is to be further appreciated that the specific type of element that provides such electrical resistance value is not a limitation upon the present invention. As such, each resistive element could be a resistor or some other element that has an electrical resistance. Also, although the term "element" is used, it is to be appreciated that the element may itself be composed of plural, smaller resistive elements. For example, each resistive element could be a single resistor or two or more resistors (e.g., two smaller resistors connected to add to a combined resistance value). Thus, the phrase "resistive element" should be given a broad scope and not be a limitation concerning the specific structure/number/composition of items that provide each resistive element.

In one group of examples, the charge division resistive elements (e.g., 22A-22(N+1)) have the same resistance value and are designated R. However, it is to be appreciated that within another group of examples, the charge division resistive elements (e.g., 22A-22(N+1)) do not have the same resistance value. Within further specific examples, some resistive elements may have a same resistance value or all resistive elements may have completely different resistance values.

In accordance with an example aspect of the present invention, the charge division resistive elements (e.g., 22A-22(N+1)) provide at least part of means for determining which of the plural detectors 12A-12N actually experiences a specific detection event (i.e., reception of a neutron). Also, in accordance with an example aspect of the present invention, the charge division resistive elements (e.g., 22A-22(N+1)) provide at least part of means to determine which, if any, of the detectors 12A-12N is not properly operating to perform a detection event.

It is to be recalled that when an individual detector (e.g., 12A-12N) has a detection event (i.e., reception of a neutron), a charge is generated at that detector anode. Herein the charge is designated $Q_T$. As such, $Q_T$ is a charge generated at a respective anode output of a detector that has detected the at least one of rays, ions and particles. In accordance with an example aspect of the present invention, the charge division resistive elements (e.g., 22A-22(N+1)) provide at least part of means for determining which of the plural detectors 12A-12N actually experiences a specific detection event (i.e., reception of a neutron) via division of charge between the first and second measurement points. Also, in accordance with an example aspect of the present invention, the charge division resistive elements (e.g., 22A-22(N+1)) provide at least part of means to determine which, if any, of the detectors 12A-12N is not properly operating to perform a detection event via expected division of charge between the first and second measurement points.

Upon a detection event (i.e., reception of a neutron) at one of the detectors (e.g., 12A-12N), the value of charge at the two Measurement Points A and B is as follows:

$$Q_A = \frac{\sum_{i=1}^{n} R_i}{\sum_{i=1}^{N+1} R_i} Q_T \text{ and } Q_B = \frac{\sum_{i=n+1}^{N+1} R_i}{\sum_{i=1}^{N+1} R_i} Q_T$$

in which:
$Q_A$ is a charge measured at the first measurement point;
$Q_B$ is a charge measured at the second measurement point;
$Q_T$ is a charge generated at a respective anode output of a detector that has detected the at least one of rays, ions and particles;
N is a total number of detectors connected within the electrical series;
i is a counting integer;
$R_i$ is the respective resistance of the respective resistive element at sequential location i;
n is the number, counting sequentially from the first measurement point toward the second measurement point, of the detector at which the detection of the at least one of rays, ions and particles has occurred; and
$Q_T$ equal $Q_A + Q_B$.

It is to be appreciated that the above equations provide for an ability of have resistive elements of varying values (i.e., not all the same resistance values). Further, with the determined values $Q_A$ and $Q_B$ a division of charge analysis between the first and second measurement points can be used to identify which of the plural detectors 12A-12N actually experienced a specific detection event (i.e., reception of a neutron). Similarly, if a specific detection event (i.e., reception of a neutron) was expected (e.g., in a test mode) a lack of proper operation, via lack of expected charge division result, can occur.

It is to be appreciated that any type of division of charge analysis can be utilized. As examples, a ratio of the division of charge between the first and second measurement points or other comparison of the division of charge between the first and second measurement points can be utilized.

It is to be appreciated that a different variety of mathematical techniques could be used to determine the detector at which the detection event (i.e., reception of a neutron) occurred (or should have occurred). As such, specific mathematical techniques need not be general limitation upon the present invention. For example, if the specific resistance value of the resistive element is varied, different mathematical techniques could be used. Thus, variation of number and/or resistance values could result in use of different mathematical techniques. Below is such an example if all of the resistive elements have the same resistance value. Specifically, upon a detection event (i.e., reception of a neutron) at one of the detectors (e.g., 12A-12N), the value of charge at the two Measurement Points A and B is as follows:

$$Q_A = \frac{n}{(N+1)} Q_T \text{ and } Q_B = \frac{(N-n)}{(N+1)} Q_T$$

$$Q_T = Q_A + Q_B$$

In which:
$Q_A$ is the charge measured at Measurement Point A;
$Q_B$ is the charge measured at Measurement Point B;
$Q_T$ is a charge generated at a respective anode output of a detector that has detected the at least one of rays, ions and particles;
N is the total number of detectors connected within the series;
n is the number, counting sequentially from the Measurement Point A toward the Measurement Point B, of the detector at which the detection event (i.e., reception of a neutron) occurred (i.e., $n^{th}$ detector can be any of detectors (e.g., 12A-12N)); and
$Q_T$ equal $Q_A + Q_B$.

The following equation is one example equation that can be utilized for division of charge analysis:

$$z = \frac{(Q_A - Q_B)}{(Q_A + Q_B)}$$

In which:
$Q_A$ is the charge at Measurement Point A;
$Q_B$ is the charge at Measurement Point B; and
z is within a range from −1 to 1.

Proceeding further, the detector (e.g., one of 12A-12N) having experienced (or should have experienced) a specific detection event (i.e., reception of a neutron) can be identified via the following:

The $n^{th}$ detector produces a value of $z=1-2n/(N+1)$

In which:
n is the number, counting sequentially from the Measurement Point A toward the Measurement Point B, of the detector at which the detection event (i.e., reception of a neutron) occurred (i.e., $n^{th}$ detector can be any of detectors (e.g., 12A-12N)). Again, a variety of mathematical techniques could be used to determine the detector for a particular event, including the examples described herein. As such, the present invention need not be limited to a specific mathematical technique. For example, the above equations can thus be solved for "n" so that the $n^{th}$ detector (e.g., 12A-12N) can be identified as the detector at which the detection event (i.e., reception of a neutron) occurred.

Charges $Q_A$ and $Q_B$ can be referred to as partial charges because the series of resistive elements 22A-22(N+1) divide the charge $Q_T$. The relationship (e.g., ratio, comparison, etc.) between the two charges $Q_A$ and $Q_B$ is unique and constant for each detector, allowing specific interrogation of an individual detector in an N-detector arrangement with only two measurement points A and B. It should be noted that N (upper case) designates the last overall detector and that n (lower case) designates the detector at which the detection event (i.e., reception of a neutron) occurred. It should be further noted that the $n^{th}$ detector can be any of the detectors 12A-12N. It should be still further noted that the number n (lower case) can be equal to the number N (upper case), but need not be equal to the number N since the $n^{th}$ detector can be any of the detectors. It is to be appreciated that the electrical circuitry 20 may utilize one or more processors to operate concerning calculation based upon any or all of the above equations or different calculation/equations as mentioned.

It is to be appreciated the overall number N of detectors 12A-12N can be varied and the equations will still be processed so that the $n^{th}$ detector can be identified as the detector at which the detection event (i.e., reception of a neutron) occurred. Also, it is to be appreciated that the detector arrangement 10 can be constructed so as to have mixed resistance values or any desired different resistance value, if all are to be the same, for the resistive elements 22A-22(N+1), and appropriate calculations/equations can be processed so that the $n^{th}$ detector can be identified as the detector at which the detection event (i.e., reception of a neutron) occurred.

The ability to identify the detector (i.e., the $n^{th}$ detector) at which the detection event (i.e., reception of a neutron) occurred, in accordance with an aspect of the present invention, is useful to provide an improved ability to discern the neutron activity location. Such can be referred to as improved resolution or definition. Also, the ability to identify the detector (i.e., the $n^{th}$ detector) at which a detection event (i.e., reception of a neutron) did or should have occurred, in accordance with an aspect of the present invention, is useful to provide an improved ability to determine proper operation of each detector 12A-12N within the detector arrangement 10. For example, if detection is expected at a certain detector (e.g., detector 12C), such as during testing, and such detection does not occur at such certain detector, it can be discerned that an issue may exist with such certain detector. Also, it is possible to keep track of the statistics of occurrence of detection by each of the detectors 12A-12N within the detector arrangement 10. If the statistics indicate that no or little detection activity has occurred by a certain detector, it can be discerned that an issue may exist with such certain detector. Diagnosis, and correction/repair as needed, is thus aided as a benefit in accordance with an aspect of the present invention.

Figure 2:
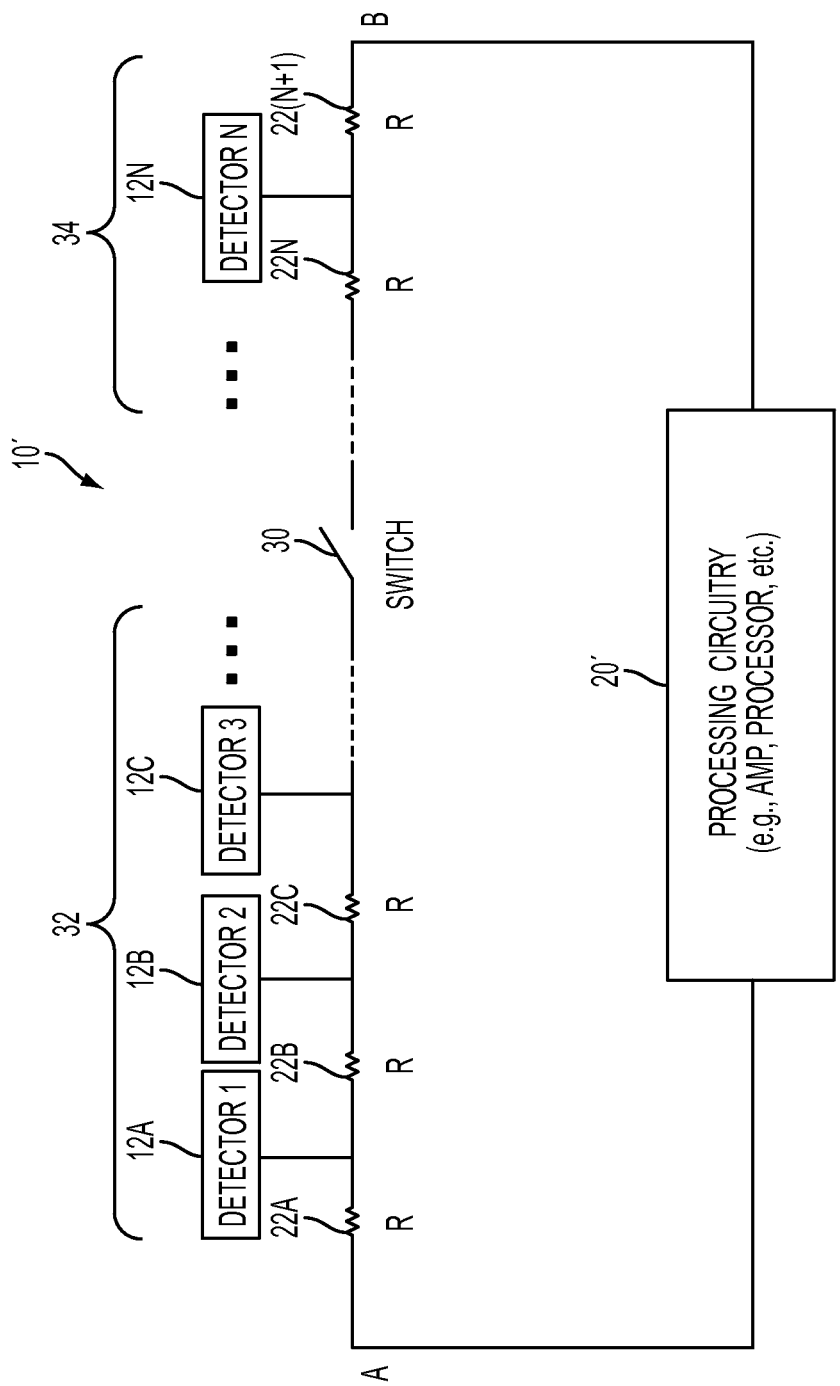
FIG. 2 is a schematic illustration of another example neutron detector arrangement similar to the first example of FIG. 1, but with an included separating switch in accordance with an aspect of the present invention.

In accordance with an aspect of the present invention, a switch 30 is added within the serial electrical connection of the detector arrangement 10' to separate a first group or bank 32 of detectors from a second group or bank 34 of detectors as shown within the example of FIG. 2. With regard to the detector arrangement 10' of FIG. 2 in comparison to the detector arrangement 10 of FIG. 1, it is to be appreciated that at least the presence of the switch 30 provides at least one difference and as such at least some reference number identifiers are distinguished by the use of the "'" (prime). However, many of the portions of the two example detector arrangements 10 and 10' may be similar or identical. Some utilized reference numbers (e.g., 12A-12N and 22A-22(N+1)) are identical between the two examples, and some utilized reference numbers are distinguished by the use of the "'" (prime) (e.g., 20 and 20'). It should be appreciated that the portions may be identical, similar or notably different. But such need not be specific limitations upon the present invention.

It is to be appreciated that the switch 30 may be located at any desired point between the two measurement points, such as between two otherwise electrically adjacent detectors (e.g., 12J and 12K, not specifically shown in the example of FIG. 2, but represented within the abbreviation ellipses in FIG. 2) within the serial electrical connection, and can be used to provide an ability to separate the predefined groups 32 and 34 of detectors 12A-12N. It is to be appreciated that one of the resistive elements (e.g., 22K, not specifically shown in the example of FIG. 2, but represented within the abbreviation ellipses in FIG. 2) may be located adjacent to the switch 30. The adjacent resistive element (e.g., 22K) may be on either side of the switch 30 or the resistance value may be distributed to two smaller resistive elements located on both sides of the switch. The addition of the switch 30 at some point along the serial electrical connection allows the detector arrangement 10' to be used in multiple (e.g., two) modes.

Such addition of the switch 30 may be specifically used in the detector arrangement 10' that, during routine operation, only senses charge at a single output point (e.g., Measurement Point A) for the first group or bank 32 of detectors and senses charge at a single output point (e.g., Measurement Point B) for the second group or bank 34 of detectors. Such routine operation is accommodated via a switch open condition of the switch 30. It is to be appreciated that electrical circuitry 20' (schematically represented) is provided for processing the electrical signals/pulses, separately, from the two groups 32, 34 of detectors. As such, the reference numeral 10' includes the designator "'" (prime) to indicate that a difference may be present as compared to the counterpart within the example of FIG. 1. It is to be appreciated that specifics of the electrical circuitry 20' (FIG. 2) may include respective one or more amplifiers (i.e., preamplifiers), one or more counters, one or more processors, one or more memories, one or more clocks and the like.

The switch open condition (i.e., switch 30 is open) can be referred to as a first mode of operation. It is to be noted that, with the switch 30 open, the serially connected detector outputs 12A-12N of each group (e.g., 32 and 34) of detectors has one Measurement point (e.g., A or B) for the respective electrical circuitry 20'. Thus, the signal from each group (e.g., 32 or 34) is an output summation. Each summation signal allows detection/counting at the respective single output point (e.g., Measurement point A or B). However, with only a single output point for each group (e.g., 32 or 34), identification of a specific detector responsible for a charge resulting from a detection event (i.e., reception of a neutron) and/or analysis of operation/non-operation of a specific detector may not be possible.

In a second mode of operation (i.e., switch 30 closed), with the switch closed the charge division operation and analysis, as described above in connection with the example of FIG. 1, can be performed. Specifically, via the series of resistive elements 22A-22(N+1), dividing the charge, the individual anode outputs of detectors 12A-12N and thus the detectors 12A-12N in the detector arrangement 10' can be distinguished analyzed. See the above discussed example equations. Of course, other equations/calculations can be used.

Figure 3:
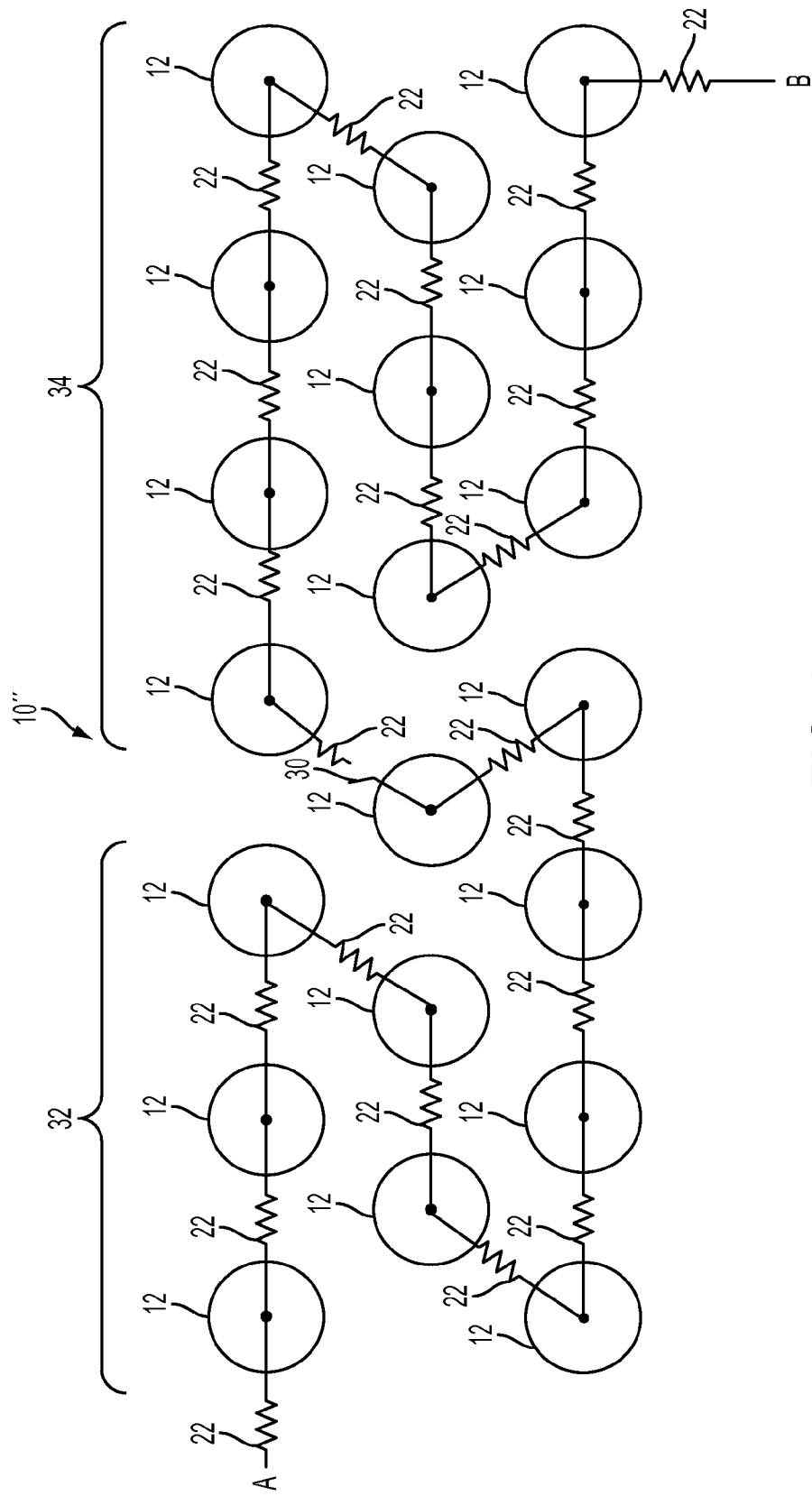
FIG. 3 is a schematized illustration of another example neutron detector arrangement having an example series of twenty detectors, interconnected charge division resistive elements and a separating switch, with detectors arranged into an example two dimensional matrix array.

As mentioned, the groups or banks 32 and 34 of detectors can be separated at any convenient or useful point. For example FIG. 3 shows a detector arrangement 10" that has twenty detectors and with the "''" (i.e., double prime) within the reference numeral being used to designate a specific example which may otherwise have same/similar constructions/configurations as previously discussed. All of the detectors are generically designated 12 and all resistive elements are generically designated 22. Since the arrangement 10" has twenty detectors, the $N^{th}$ detector is the $20^{th}$ detector (i.e., N=20). Within the particular example of FIG. 3, the detectors 12 are arranged to have a two dimensional array configuration (e.g., three rows, with each row having multiple detectors). The first group 32 is the first ten detectors and the second group 34 is the final ten detectors. The switch 30 is located between the first and second groups 32, 34. As can be seen within FIG. 3, the switch 30 is generally located in a middle of a left-right, as viewed in FIG. 3, perspective of the detectors 12. As such, the switch 30 is capable of electrically separating the detectors 12 as left and right groups 32, 34 as viewed in FIG. 3.

Figure 4:
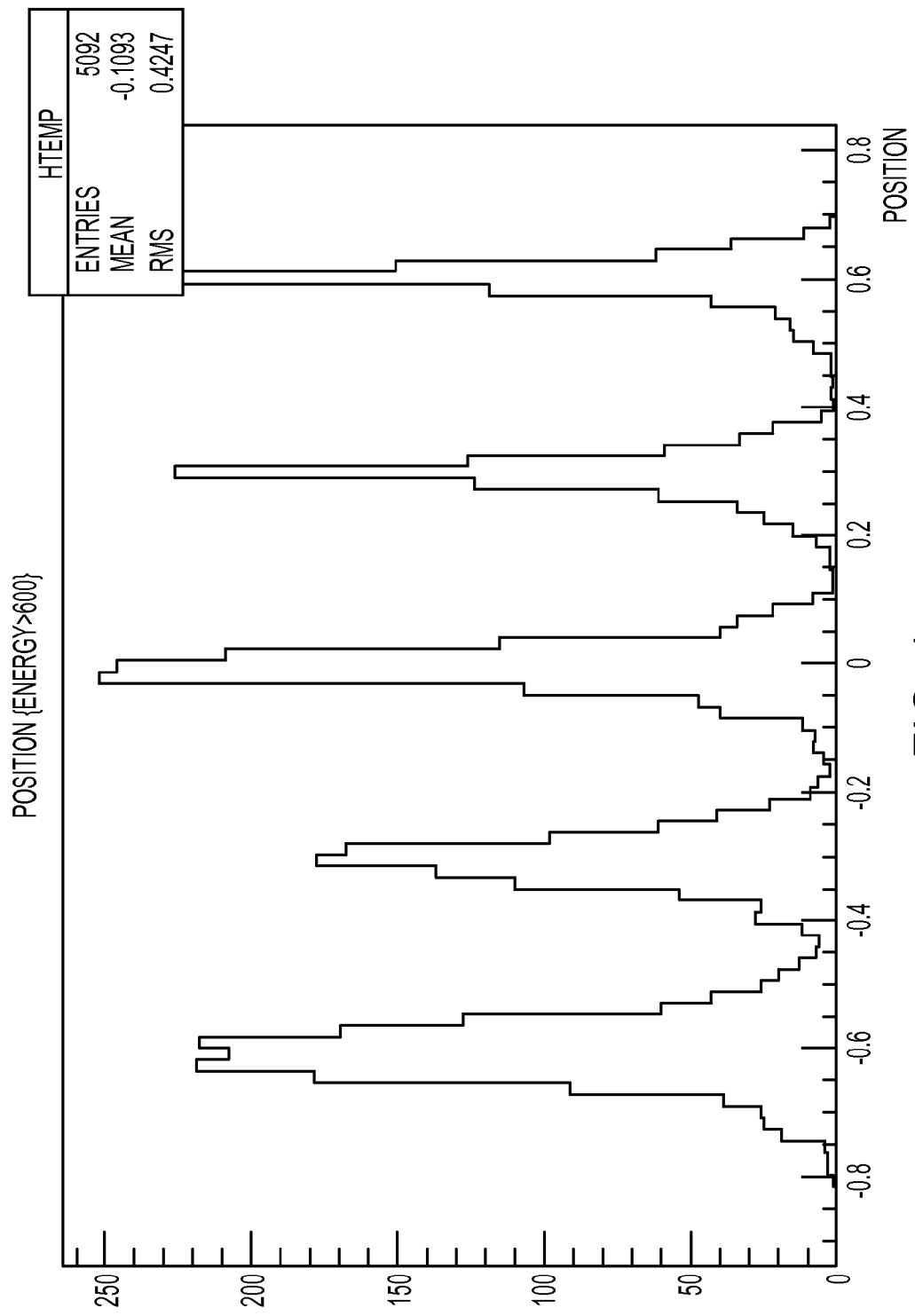
FIG. 4 is an example display/utilization plot of data for an example five detector arrangement.

As mentioned, the individual anode outputs of the detectors 12 in the arrangement can be distinguished. Since individual anode outputs of detectors 12 can be distinguished, detector-specific data can be collected, analyzed, displayed, or otherwise utilized. FIG. 4 shows one example display/utilization of the data for an example five detector arrangement. The chart of FIG. 4 shows data peak plots for each of the five detectors. The specific characteristic of the plots can be further analyzed to determine further information about operation of specific detectors or the overall detector arrangement.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A detector arrangement for detecting at least one of rays, ions and particles, the arrangement including:
 a plurality of detectors, each for detecting the at least one of rays, ions and particles, each detector having a respective anode output for outputting a charge upon detection of the at least one of rays, ions and particles at the respective detector, the plurality of detectors arranged with the respective anode outputs being in an electrical series;
 a plurality of resistive elements, each resistive element having a resistance value, being interspersed in the electrical series with the anode outputs of the plurality of detectors;
 a first measurement point at a first end of the electrical series and a second measurement point at a second end of the electrical series;
 electrical circuitry, electrically connected to the first and second measurement points for receiving electrical signals/pulses from the first and second measurement points, and for using the electrical signals/pulses from the first and second measurement points to determine which of the plurality of detectors has detected the at least one of rays, ions and particles; and
 a switch interposed between at least first and second groups of the plurality of detectors, the switch having a closed position in which the electrical series is provided continually between the first and second measurement points, and the switch having an open position in which the electrical series is electrically isolated into two groups of detectors, with each group being electrically connected to only one of the first and second measurement points.

2. An arrangement as set forth in claim 1, wherein the electrical circuitry operates utilizing a division of charge between the first and second measurement points.

3. An arrangement as set forth in claim 2, wherein the electrical circuitry operates utilizing the resistance values of the plurality of resistive elements.

4. An arrangement as set forth in claim 3, wherein the plurality of resistive elements includes a resistive element of the plurality of resistive elements being located between each adjacent pair of detector anode outputs within the electrical series and a resistive element of the plurality of resistive elements being located at each end of the series of detector anode outputs.

5. An arrangement as set forth in claim 4, wherein the electrical circuitry operates utilizing the following equations:

$$Q_A = \frac{\sum_{i=1}^{n} R_i}{\sum_{i=1}^{N+1} R_i} Q_T \text{ and } Q_B = \frac{\sum_{i=n+1}^{N+1} R_i}{\sum_{i=1}^{N+1} R_i} Q_T$$

in which:
 $Q_A$ is a charge measured at the first measurement point;
 $Q_B$ is a charge measured at the second measurement point;
 $Q_T$ is a charge generated at a respective anode output of a detector that has detected the at least one of rays, ions and particles;
 N is a total number of detectors connected within the electrical series;
 i is a counting integer;
 $R_i$ is the respective resistance of the respective resistive element at sequential location i; and
 n is the number, counting sequentially from the first measurement point toward the second measurement point, of the detector at which the detection of the at least one of rays, ions and particles has occurred.

6. An arrangement as set forth in claim 5, wherein the electrical circuitry includes at least one processor to operate concerning calculation based upon the equations:

$$Q_A = \frac{\sum_{i=1}^{n} R_i}{\sum_{i=1}^{N+1} R_i} Q_T \text{ and } Q_B = \frac{\sum_{i=n+1}^{N+1} R_i}{\sum_{i=1}^{N+1} R_i} Q_T$$

7. An arrangement as set forth in claim 2, wherein the plurality of resistive elements each have the same resistance value, and a resistive element of the plurality of resistive elements being located between each adjacent pair of detector anode outputs within the electrical series and a resistive element of the plurality of resistive elements being located at each end of the series of detector anode outputs.

8. An arrangement as set forth in claim 7, wherein the electrical circuitry operates utilizing the following equations:

$$Q_A = \frac{n}{(N+1)} Q_T \text{ and } Q_B = \frac{(N-n)}{(N+1)} Q_T$$

in which:
 $Q_T$ is a charge generated at a respective anode output of a detector that has detected the at least one of rays, ions and particles;
 $Q_A$ is a charge at the first measurement point;
 $Q_B$ is a charge at the second measurement point;
 N is a total number of detectors connected within the electrical series;
 R is the resistance of each resistive element; and
 n is the number, counting sequentially from the first measurement point toward the second measurement point, of the detector at which the detection of the at least one of rays, ions and particles has occurred.

9. An arrangement as set forth in claim 8, wherein the electrical circuitry includes at least one processor to operate concerning calculation based upon the equations:

$$Q_A = \frac{n}{(N+1)} Q_T \text{ and } Q_B = \frac{(N-n)}{(N+1)} Q_T.$$

10. An arrangement as set forth in claim 8, wherein a specific detection event can be identified via the following:

$$z = \frac{(Q_A - Q_B)}{(Q_A + Q_B)}$$

with z within a range from −1 to 1, and the nth detector produces a value of z=1−2n/(N+1).

11. An arrangement as set forth in claim 2, wherein the electrical circuitry operates utilizing a comparison of the division of charge between the first and second measurement points.

12. An arrangement as set forth in claim 1, wherein, with the switch in the closed position, the electrical circuitry operates utilizing a division of charge between the first and second measurement points.

13. An arrangement as set forth in claim 12, wherein, with the switch in the closed position, the electrical circuitry operates utilizing the resistance values of the plurality of resistive elements.

14. An arrangement as set forth in claim 13, wherein the plurality of resistive elements includes a resistive element of the plurality of resistive elements being located between each adjacent pair of detector anode outputs within the electrical series and a resistive element of the plurality of resistive elements being located at each end of the series of detector anode outputs.

15. An arrangement as set forth in claim 14, wherein, with the switch in the closed position, the electrical circuitry operates utilizing the following equations:

$$Q_A = \frac{\sum_{i=1}^{n} R_i}{\sum_{i=1}^{N+1} R_i} Q_T \text{ and } Q_B = \frac{\sum_{i=n+1}^{N+1} R_i}{\sum_{i=1}^{N+1} R_i} Q_T$$

in which:
$Q_A$ is a charge at the first measurement point;
$Q_B$ is a charge at the second measurement point;
N is a total number of detectors connected within the electrical series;
i is a counting integer;
$R_i$ is the respective resistance of the respective resistive element at sequential location i; and
n is the number, counting sequentially from the first measurement point toward the second measurement point, of the detector at which the detection of the at least one of rays, ions and particles has occurred.

16. An arrangement as set forth in claim 12, wherein the plurality of resistive elements each have the same resistance value, and a resistive element of the plurality of resistive elements being located between each adjacent pair of detector anode outputs within the electrical series and a resistive element of the plurality of resistive elements being located at each end of the series of detector anode outputs.

17. An arrangement as set forth in claim 16, wherein, with the switch in the closed position, the electrical circuitry operates utilizing the following equations:

$$Q_A = \frac{n}{(N+1)} Q_T \text{ and } Q_B = \frac{(N-n)}{(N+1)} Q_T$$

in which:
$Q_T$ is a charge generated at a respective anode output of a detector that has detected the at least one of rays, ions and particles;
$Q_A$ is a charge at the first measurement point;
$Q_B$ is a charge at the second measurement point;
N is a total number of detectors connected within the electrical series;
R is the resistance of each resistive element; and
n is the number, counting sequentially from the first measurement point toward the second measurement point, of the detector at which the detection of the at least one of rays, ions and particles has occurred.

18. An arrangement as set forth in claim 17, wherein a specific detection event can be identified via the following:

$$z = \frac{(Q_A - Q_B)}{(Q_A + Q_B)}$$

with z within a range from −1 to 1, and the nth detector produces a value of z=1−2n/(N+1).

19. An arrangement as set forth in claim 12, wherein, with the switch in the closed position, the electrical circuitry operates utilizing a comparison of the division of charge between the first and second measurement points.

* * * * *